United States Patent
McDonald (10) Patent No.: US 10,384,088 B1
(45) Date of Patent: Aug. 20, 2019

(54) HOSE CARRIER

(71) Applicant: Dustin McDonald, Hiram, GA (US)

(72) Inventor: Dustin McDonald, Hiram, GA (US)

(*) Notice: Subject to any disclaimer, the term of this patent is extended or adjusted under 35 U.S.C. 154(b) by 0 days.

(21) Appl. No.: 16/013,897

(22) Filed: Jun. 20, 2018

(51) Int. Cl.
| *F16L 3/00* | (2006.01) |
| *A62C 33/04* | (2006.01) |
| *F16L 3/18* | (2006.01) |
| *B65G 39/12* | (2006.01) |
| *B65H 75/40* | (2006.01) |

(52) U.S. Cl.
CPC ............ *A62C 33/04* (2013.01); *F16L 3/18* (2013.01); *B65G 39/12* (2013.01); *B65H 75/403* (2013.01); *B65H 2701/33* (2013.01)

(58) Field of Classification Search
CPC ..... F16L 3/003; F16L 3/26; F16L 3/00; F16L 3/02; F16L 3/1075; F16L 3/12
USPC ............ 248/68.1, 74.1, 75, 80, 83, 87
See application file for complete search history.

(56) References Cited

U.S. PATENT DOCUMENTS

| 7,527,227 B1* | 5/2009 | Mondello ............... A62C 33/00 |
| | | 242/615.2 |
| D597,403 S * | 8/2009 | Ho ................................. D8/356 |
| 10,128,641 B2* | 11/2018 | Cuppen ..................... H02G 3/32 |
| 2001/0028021 A1* | 10/2001 | Martin .................... B65H 57/14 |
| | | 248/87 |
| 2013/0187012 A1* | 7/2013 | Blakeley .................. H02G 3/32 |
| | | 248/68.1 |
| 2014/0259620 A1* | 9/2014 | Hicks ....................... F16L 3/223 |
| | | 29/525.01 |
| 2015/0048222 A1* | 2/2015 | Eley .......................... A01G 9/28 |
| | | 248/87 |

* cited by examiner

*Primary Examiner* — Steven M Marsh
(74) *Attorney, Agent, or Firm* — Lamon Patent Services; Cynthia S. Lamon (57) ABSTRACT

An apparatus comprising a cylindrical split frame, hinged on one side with a latch on the other side, a plurality of roller appendages extending outward from the frame, presenting axle rods having rollers. The apparatus clamps over a hose or a conduit and carries the hose or conduit on the rollers.

12 Claims, 11 Drawing Sheets

HOSE CARRIER

CROSS-REFERENCE TO RELATED APPLICATIONS

The present application claims priority to co-pending application Ser. No. 15/784,115, filed Oct. 17, 2017, which claims priority to a provisional patent application, 62/414,350, filed Oct. 28, 2016, and all disclosure of the parent applications is incorporated herein at least by reference.

BACKGROUND OF THE INVENTION

1. Field of the Invention

The present invention is the technical area of mechanical devices for reducing friction; and pertains more particularly to a device for reducing friction and drag for hoses and other conduits, when moving such conduits over supporting surfaces.

2. Description of Related Art

It is well known in the art that there are many pressing needs for moving and relocating hoses and other conduits in many different circumstances. Hoses in gardening and landscaping applications, for example, typically must be connected at a head end to a hose spike, or other source of water, and must be moved to a point of application that may be quite remote from the source. Further, a hose may need to be moved frequently to other points of application, such as, to water specific plants. As another example, heavy hoses in firefighting applications need to connect at a source end, and must be moved to point of application for fighting such as brush fires and structure fires. The ability to move and relocate hoses is critical to success in fighting a fire of any sort.

There exist, at the time of filing the present application, no specific solution for the problem of moving hoses and other conduits over ground or structural surfaces other than just picking up the hose, or a portion of the hose and carrying it to a different location. Therefore, what is clearly needed is a device or implement that may pair with a hose or conduit in a plurality of positions, providing rollers between the hose or conduit and surfaces upon which the hose may travel.

BRIEF SUMMARY OF THE INVENTION

In an embodiment of the invention an apparatus providing rolling support for a hose or conduit is provided, comprising a frame split lengthwise along two lines, providing two separate frame elements as half-cylinders, that joined along the split lines form a cylinder having an inside diameter and inside surfaces, an outside diameter and outside surfaces, and a lengthwise axis, a hinge mechanism joining the separate frame elements along one of the split lines, and a closing mechanism implemented along the other split line, such that the frame may be opened manually and held closed, a plurality of roller appendages extending outward from the outside surfaces of the cylindrical frame, each appendage providing axle rods extending on both sides of each appendage, orthogonal to both the axis of the cylindrical frame, and to a radius of a circular cross-section of the cylindrical frame, and rollers rotational on the axle rods. The inside diameter of the cylindrical frame is compatible with a known hose or conduit diameter, and a user is enabled to open the cylindrical frame and close and latch the frame over a hose or conduit, providing a roller support for the hose or conduit.

In one embodiment the apparatus further comprises a relatively soft and resilient lining on the inside surfaces of the frame, enabling the frame to clamp securely over hoses or conduits of different diameters. Also, in one embodiment, the rollers vary in cross-sectional diameter, tapering from a maximum diameter at the appendage to a minimum diameter at an end, away from the appendage. In one embodiment the appendages are implemented in three circumferential rows spaced along the length of the cylindrical frame, with three appendages in each row equally spaced around the circumference in each row. And in one embodiment appendages in adjacent rows are positioned around the circumference of each row such that individual appendages in each adjacent row are not in a line parallel with the axis of the cylindrical frame.

In one embodiment the rollers are formed of a high-density polymer material, to provide long-term wear characteristics. Also, in one embodiment the rollers are formed of metal, and are coated with the high-density polymer. In one embodiment the hinge mechanism is a fabric or a thin plastic strip heat-welded or glued to the outside surface of each of the two frame elements along one of the split lines. And in one embodiment the hinge mechanism comprises alternating notches and appendages implemented along edges of each half-cylinder, a bore passing lengthwise through the appendages, and a pin through the bore serving as a rotational axis for the half-cylinders to rotate relative to one another.

In one embodiment the latch mechanism comprises a groove along one of the split lines on one of the two frame elements, and a flexible cantilevered latch element, glued or heat welded on the opposite frame element adjacent to the groove, such that closing the separate frame elements causes the cantilevered latch to engage the groove, and to hold the separate frame elements closed, to form the cylindrical aspect of the frame. In one embodiment the closing mechanism comprises alternating notches and appendages implemented along edges of each half-cylinder, a bore passing lengthwise through the appendages, and a pin through the bore serving to engage the half-cylinders closed, the pin having a threaded portion engaging a female thread in a counter-bore in at least one end of the bore. And in one embodiment the appendages are implemented in two circumferential rows spaced along the length of the cylindrical frame, with three appendages in each row equally spaced around the circumference in each row.

DETAILED DESCRIPTION OF THE INVENTION

Figure 1:
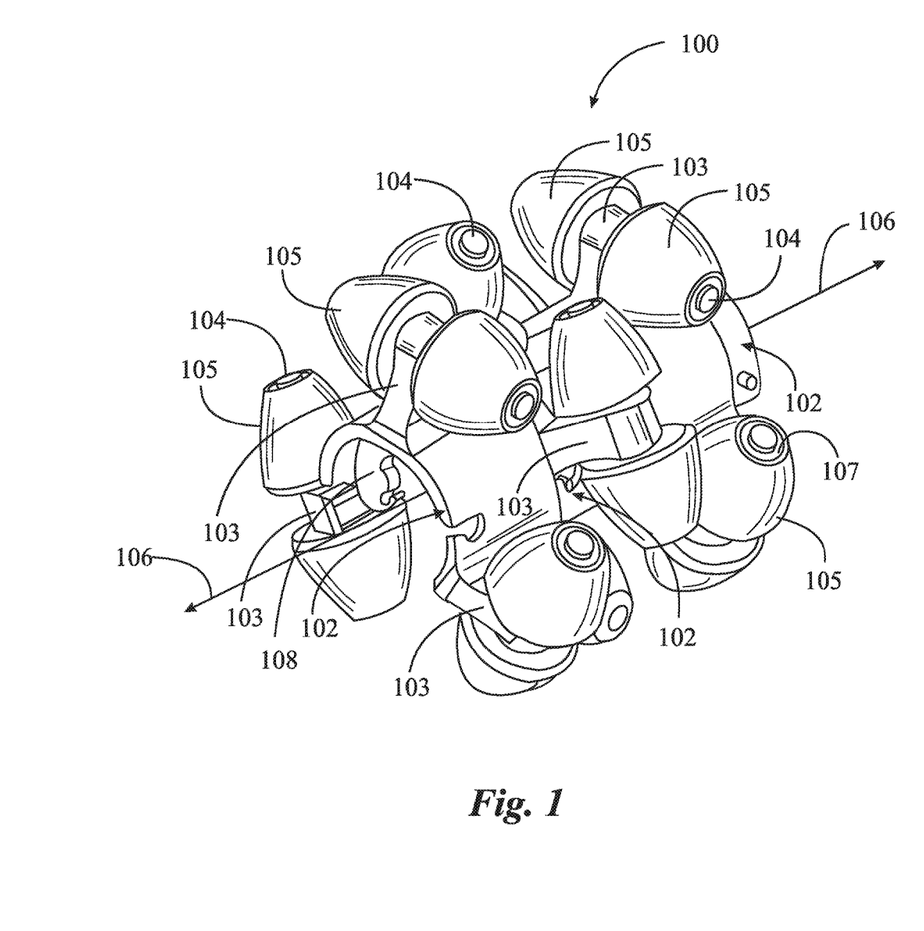
FIG. 1 is a perspective view of a roller assembly providing roller support for a hose or conduit in one embodiment of the invention.

FIG. 1 is a perspective view of a roller assembly 100 providing roller support for a hose or conduit in one embodiment of the invention, a plurality of such assemblies, attached to and spaced apart along a length of a hose or conduit, enabling the hose or conduit to move easily over any supporting surface, or around or over any restraining obstacle. Roller assembly 100 comprises, in this implementation, three connected bases 102, connected in a manner that they may entrain a hose along an axis direction 106, each base 102 having three appendages 103, each appendage 103 providing a bore mounting an axle rod 104, with each axle rod 104 providing a mount for two rollers 105, one on each side of the appendage 103. This arrangement provides a total of eighteen rollers, facing in different directions, such that a plurality of rollers will be in contact with any supporting surface or obstacle at any point in time.

In FIG. 1 not every instance of every element is provided with an element number and a witness line, for to do so would obstruct the understanding of the figure, but the skilled person will realize the repetition of elements.

Figure 2:
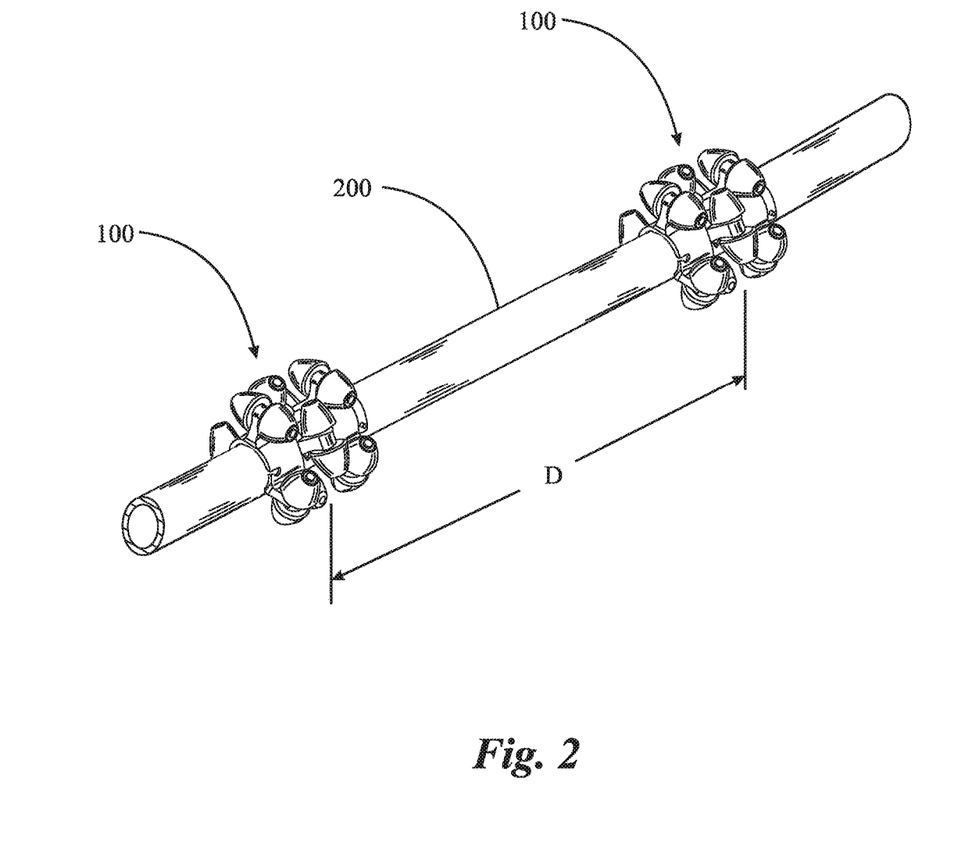
FIG. 2 is a perspective view of two roller assemblies carry a hose in an embodiment of the invention.

FIG. 2 is an exemplary view of a relatively short section of a hose 200, upon which two roller assemblies 100 have been entrained, spaced apart by an arbitrary distance D along a length of the hose. This arrangement is exemplary of a minimum implementation of the invention. In practice a practical hose in use in an embodiment of the invention might have a considerable plurality of roller assemblies spaced along the length of the hose. The spacing is also a matter of specific use, as the necessary spacing to carry the weight of a hose, and to operate to move the hose in a relatively frictionless manner across supporting surfaces, such as bare earth, grass, gravel, concrete driveways, wooden decks, and the like, may well be a function of the size and weight of the hose and also nature of the supporting surface and any obstacles to movement of the hose.

The skilled person will realize that the weight of the hose is primarily supported in part by each of the roller assemblies, and that the dimensions of elements of the roller assembly is dependent, at least in part, on the size and material of the hose, or other conduit that may be carried by roller elements in embodiments of the invention.

Figure 3:
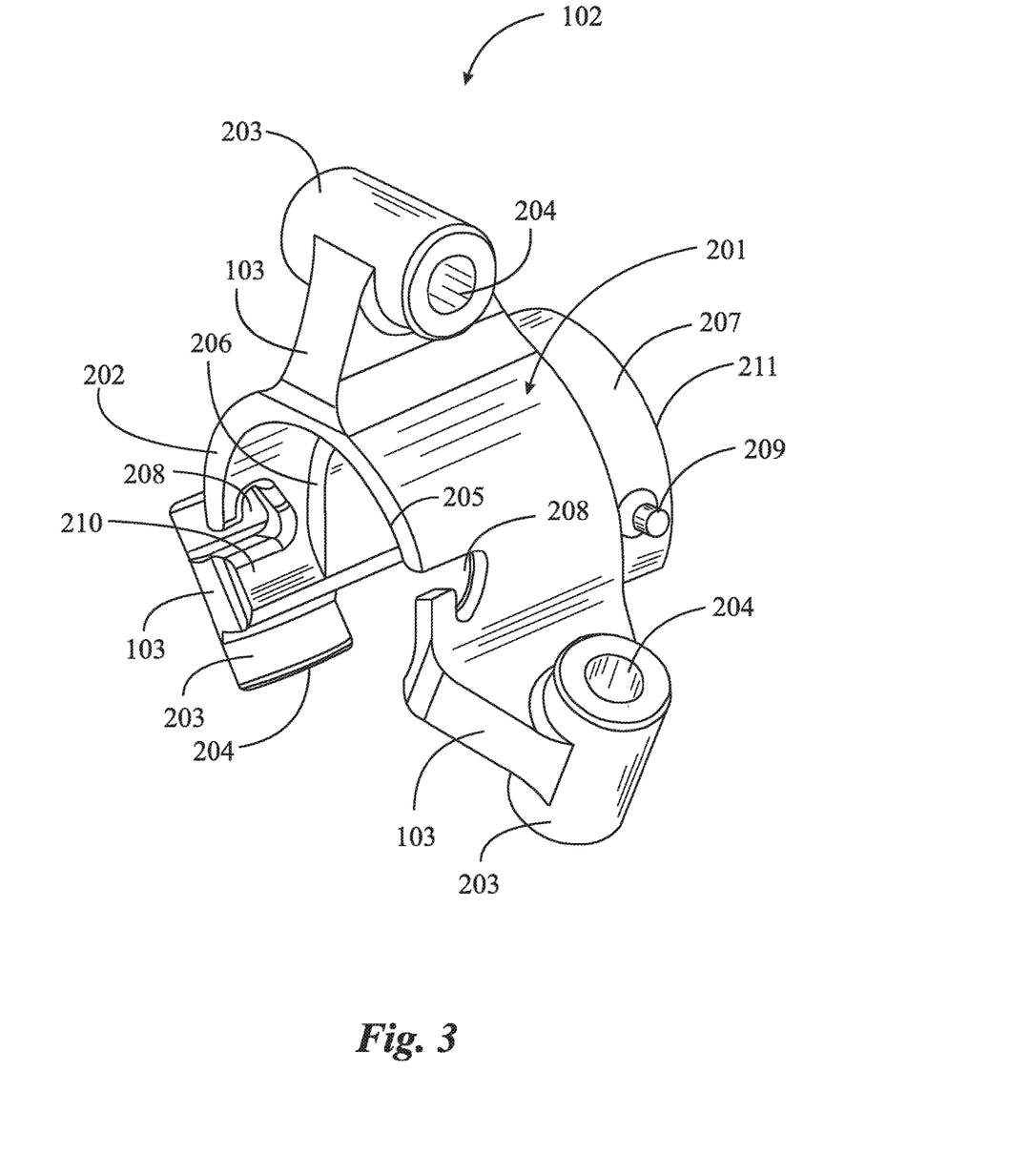
FIG. 3 is a perspective view of a single frame element in the roller assembly of FIG. 1.

FIG. 3 is a perspective view of a single frame element 102 in the roller assembly of FIG. 1. Frame element 102 comprises a partially circular body 201, open on one side, which may be placed over a hose or conduit. Body 201 has three appendages 103, spaced around the circular body in sixty-degree intervals, that each terminate on an axle-mounting element 203 having a bore 204 that has an axis that is orthogonal to a lengthwise axis of the circular body.

Circular body 201 has a female end 202 having an inner diameter 205, and a male end 207 having an outer diameter that provides a slip fit with the inner diameter of the female end, such that two such frame elements may be joined in part by engaging the male end of one into the female end of the other, aligning the two along the lengthwise axis of each. There is a shoulder 206 that serves to limit the degree of engagement of one frame element with a next frame element. Pins 209 are provided on the male end (one visible in FIG. 3, and locking grooves 208 are provided on the female end, through sidewalls of the circular body, such that, as one element is engaged in a next element in line, a rotation serves to lock the one to the other. Assembly of multiple frame elements to one another to provide a roller assembly, and engagement of the assembly to a hose or other conduit in the assembly process is described below in enabling detail.

A frame element 102 in one embodiment of the invention is an injection-molded element machine finished in some aspects. For example, it is typical of injection-molded objects like frame element 102, that there will be some molding flash to be removed, which may be done manually, or may be done by tumbling a quantity of molded elements in barrels filled with abrasive material. In some cases, further tumbling may be implemented to polish the outer surfaces of the molded elements. Finished frame elements may have bores 204 finished to size by a boring tool. In alternative embodiments such frame elements may be die cast, and finished, or may be assembled from other elements.

Figure 4:
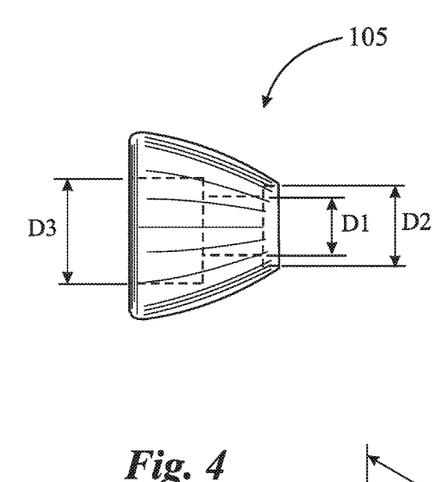
FIG. 4 is a side elevation view of a single roller of the roller assembly of FIG. 1.

FIG. 4 is a side elevation view of a single roller 105 of the roller assembly of FIG. 1. There are six of these rollers on a single frame element, and eighteen on a roller assembly combining three frame elements. Roller 105 in one embodiment is approximately cone-shaped, as shown, and may be injection molded, and machine finished. In another embodiment, Roller 105 is approximately cone-shaped and extends beyond axle rod 104, sheltering the cinching collar 107 from outside contact. Material in one embodiment may be high-density polymer material, which has a very high coefficient for wear. In other embodiment the rollers may be machined from metal or plastic, and then coated with a high-density polymer to provide the desired wear characteristics.

In one embodiment roller 105 has a through bore of diameter D1, which is controlled to be a slip fit to an axle rod described below. The roller in use must rotate on the axle rod. A counter-bore of diameter D3 from a larger end is of a dimension to fit over the outside diameter of mounting element 203 at the end of each of appendages 103 of frame element 102. Another counter-bore at the smaller end of the roller, of diameter D2, is provided to accommodate a cinching collar described below, to hold the roller on the axle rod.

Figure 5:
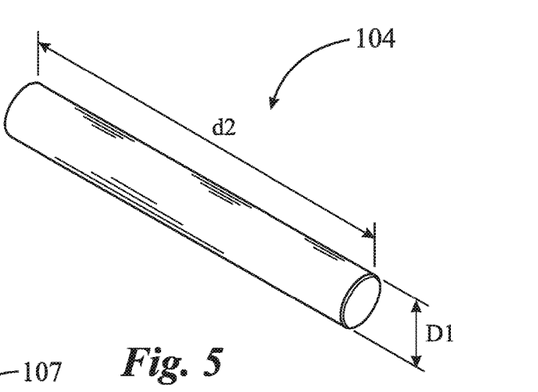
FIG. 5 is a perspective view of an axle rod from the roller assembly of FIG. 1.

FIG. 5 is a perspective view of axle rod 104 of FIG. 1, which is of a length d2 sufficient to pass through bore 204 of mounting element 203 at the end of appendage 103, to engage two rollers 105, one on each side of each mounting element at the end of each appendage 103 of a frame element. The rollers are provided to rotate mainly on axle rod 104 by bore diameter D1. The axle rods in one embodiment are surface-hardened steel and may be ground to final diameter.

Figure 6A:
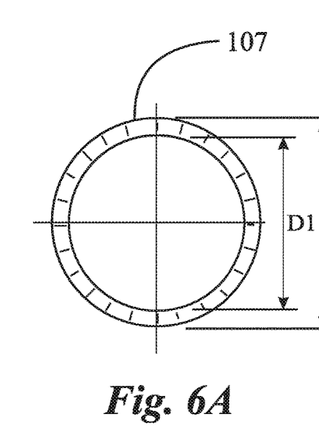
FIG. 6A is a face-on view of a retainer element from the roller assembly of FIG. 1.
Figure 6B:
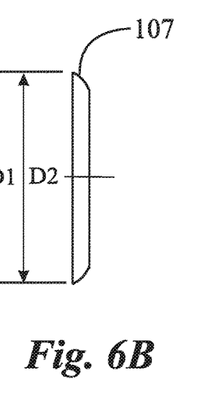
FIG. 6B is a side view, in section, of the retainer element of FIG. 1.

FIG. 6A is a face-on view of a single cinching collar 107, and FIG. 6B is a side view of the cinching collar. This collar, in one embodiment is a commercially available element known in the art for performing the function of retaining elements on a shaft in assembly. The inside diameter D1 is actually a bit smaller than diameter D1 of the axle rod, so the cinching collar may be pressed onto the axle rod in assembly and will hold the rollers in place. The outside diameter D2 of the cinching collar fits into the counter-bore D2 of the wheel in assembly.

Figure 7:
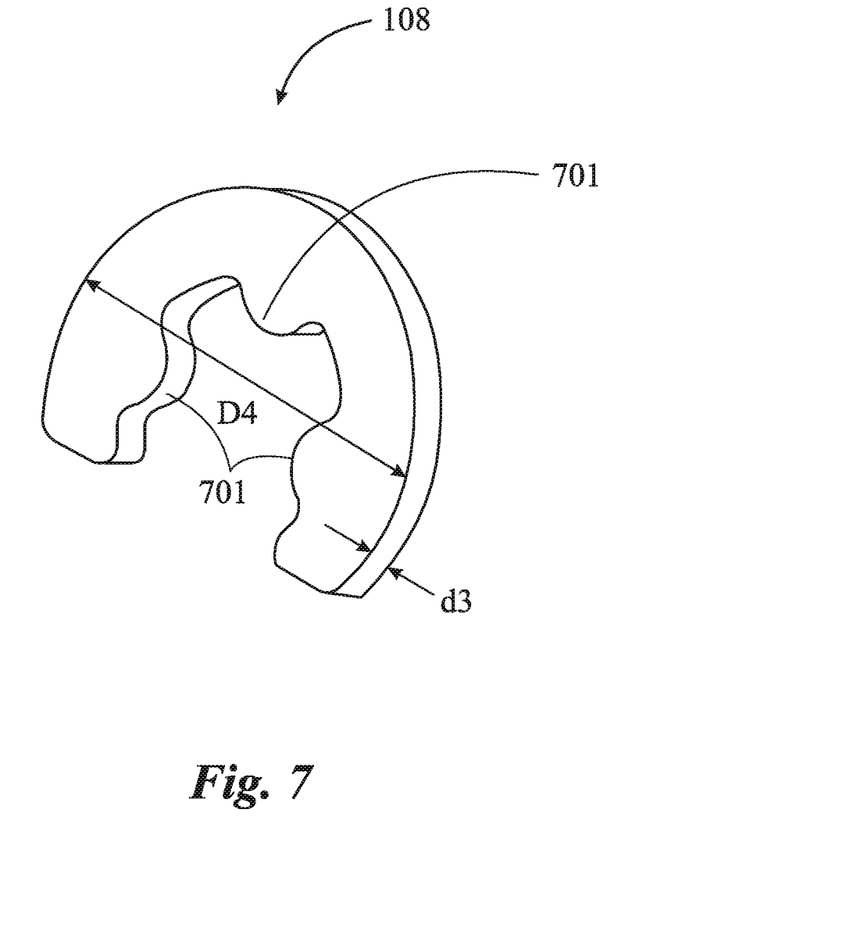
FIG. 7 is a perspective view of an assembly gasket from the roller assembly of FIG. 1.

FIG. 7 is a perspective view of an assembly gasket 108 from the roller assembly of FIG. 1. Referring now to FIG. 3, frame element 102 has shoulder 206 as a limit in female end 202. In assembly of one frame element to another, gasket 108 is placed against shoulder 206, such that an end of the male end of another frame element will contact this gasket in assembly. Thickness d3 of gasket 108 is provided such that the gasket is compressed somewhat to align posts 209 with locking grooves 208, so as the frame elements are rotated in locking, the gasket proves a force against the locking grooves, that keep the frame elements locked together. Gasket 108 has additional features 701 that engage a hose or conduit in a manner that the hose or conduit are gripped securely, even though there may be differences in diameter between individual hoses or conduits.

Figure 8:
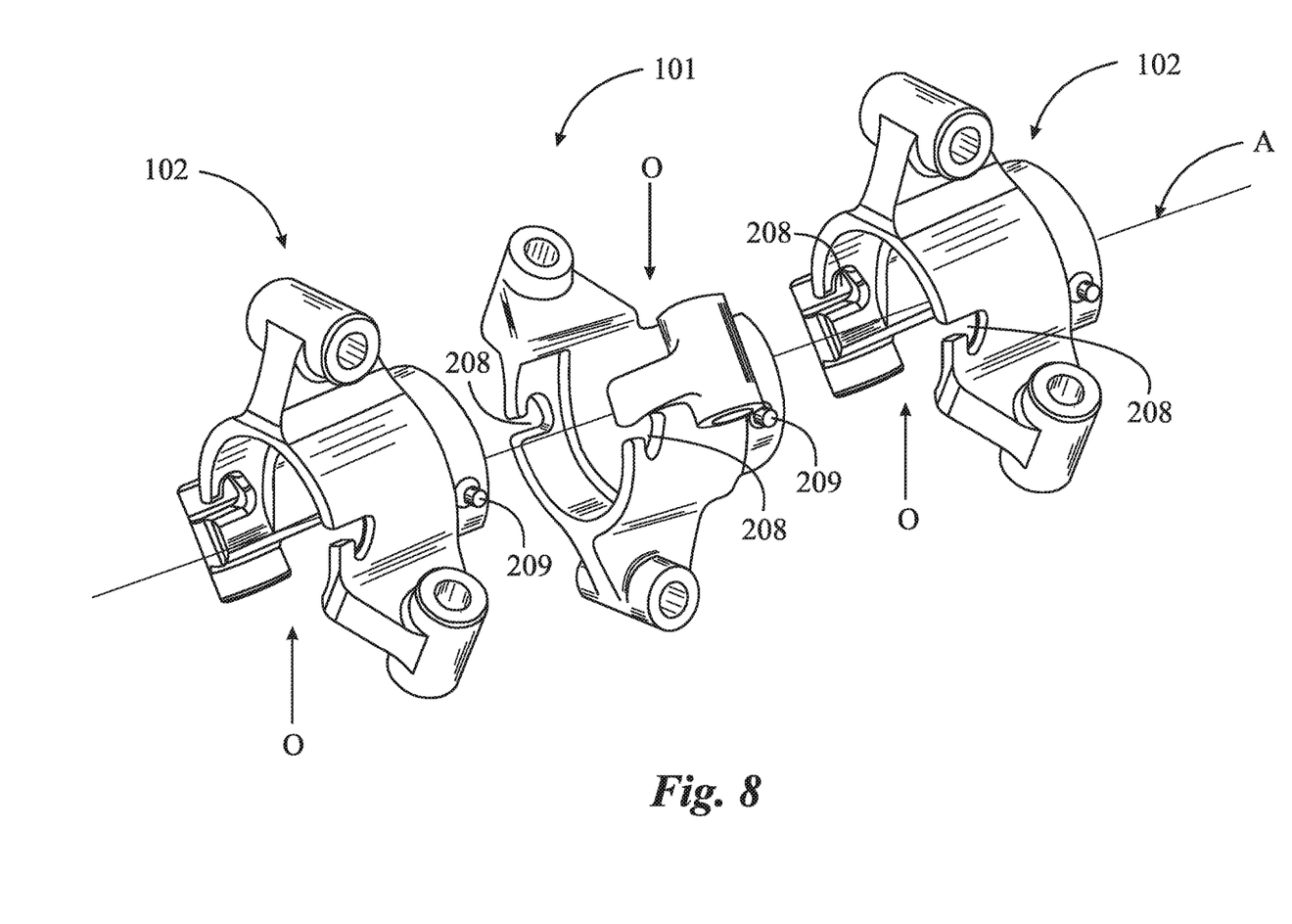
FIG. 8 is a perspective view of three frame elements aligned for assembly in an embodiment of the invention.

FIG. 8 is a perspective view of three frame elements 102 aligned for assembly to a hose or a conduit in an embodiment of the invention. The frame elements are identical. The only difference is that the frame elements on each end of the row of three are open from below, and the middle frame element is open from the top. The middle frame element is simply rotated 180 degrees around axis A, which is the axis of a hose or conduit to which the three frame elements may be engaged as assembles into a roller assembly, as shown in FIG. 1. Axle rods and rollers are not shown in FIG. 8, so the frame elements may better illustrate the relationship between the elements.

To engage one roller assembly 100 at one position along a hose or conduit, as may be seen in FIG. 2, a user will place one frame element 102, complete with axle rods and rollers, over the hose or conduit. This first frame element (furthest left in FIG. 8) will not securely engage the hose or conduit. The user will then place a second frame element, the middle element in FIG. 8, in place over the hose or conduit, rotated 180 degrees around axis A, next to the first element placed over the hose. A gasket 108 is placed in the second (middle) frame element, against shoulder 206 (see FIG. 3). The two frame elements are brought together along axis A, with the male end of the second frame element engaging the female end of the first frame element. Pins 209 of the first frame element engage the locking grooves 208 of the second frame element, requiring some force against gasket 108 to twist and engage, and when released, the gasket keeps the pins and locking grooves engaged.

Referring now to FIG. 7, illustrating gasket 108, projections 701 serve a function of compressing against the hose or conduit that is the object of the roller assembly, and enable roller assemblies of one size to be used with hoses and conduits of a variation in diameter.

It will be apparent to the skilled person that a roller assembly comprising two frame elements with axels and rollers will be relatively stable on a hose or conduit, and could be used to practice the invention, but that the roller assembly with three frame elements is more stable, and may be preferred.

In the embodiments thus far described, three frame elements, each with a side opening, are placed over a hose or conduit, and engaged with one another in a manner that the side openings are not aligned, which serves to engage the assembled frame elements to the hose or conduit. In an alternative embodiment, illustrated in perspective view in FIG. 9, a single frame element comprising two halves engaged by a hinge mechanism is used, such that the frame element may be unlatched and opened by rotating the parts relative to one another around the hinge element, than placed over the hose or conduit, closed and latched.

In the embodiment illustrated in FIG. 9 the frame is a single cylindrical unit 901, comprising two half-cylinder mirror image elements 902 and 903, separated along lines 910, joined in a manner described below such that the separate elements may be opened to join the roller assembly to a hose or a conduit, and then closed and latched. In this embodiment the appendages 103 and rollers 105 are arranged in the relationship shown and described above for the final assembly of the three frame elements as shown prior to FIG. 9, and the cylinder of the frame is split along lines that pass between the appendages for the rollers. The position of the split lines in FIG. 9 is exemplary, and not limiting, as the split lanes could be elsewhere, and not necessarily splitting the cylinder into equal halves.

Elements 904 are substantially half cylinder layers of foam rubber, or equivalent material, glued to the inside diameter of the halves on the cylindrical frame. These elements allow the roller assembly to be effectively joined to hoses or conduits of somewhat different diameters.

Figure 9:
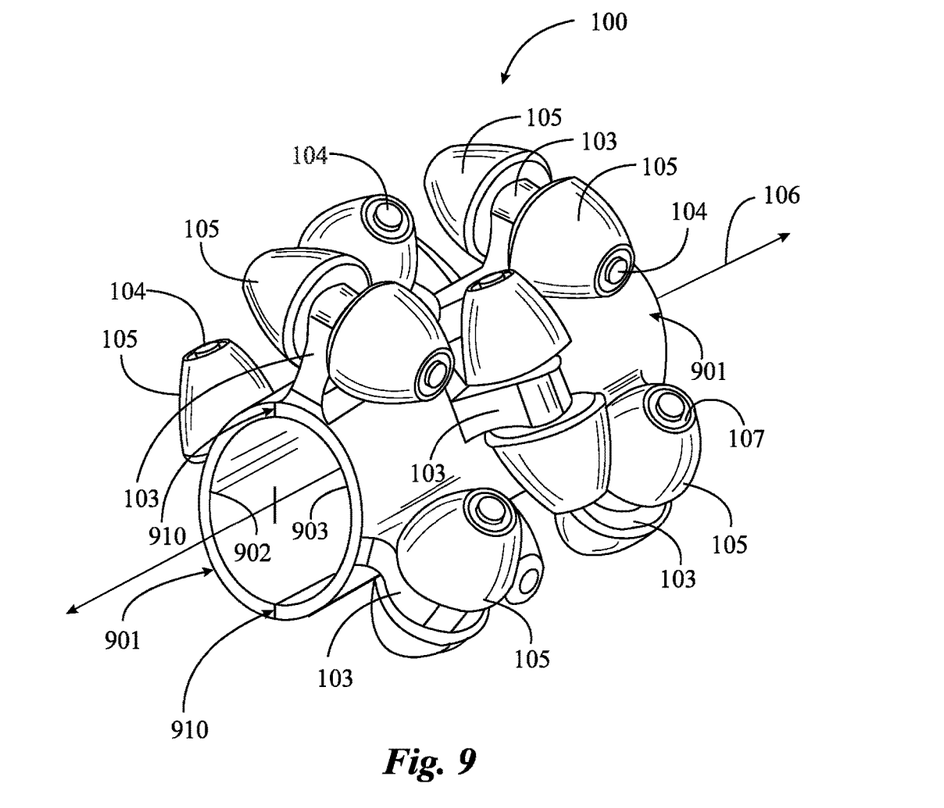
FIG. 9 is a perspective view of a roller assembly in another embodiment of the invention.
Figure 10:
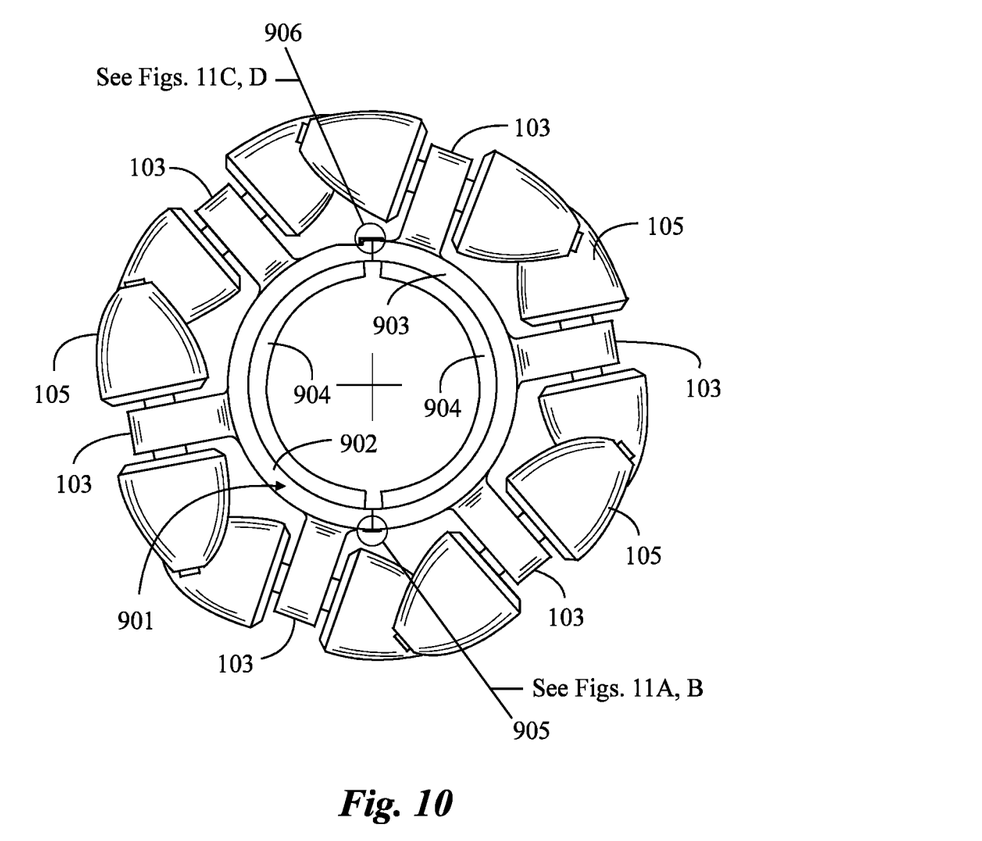
FIG. 10 is a straight-on end view of the roller assembly of FIG. 9.

FIG. 10 is a straight-on end view of the roller assembly of FIG. 9, showing an exemplary arrangement of a hinge 905 and a latch 906. In one embodiment the hinge is accomplished by a strip of fabric or thin, flexible plastic, that is heat welded or glued across the split line. As the two halves are pivoted relative to one another, the fabric allows the frame elements to pivot at the line where corners of the elements meet. In other embodiments physical and mechanical hinges of various sorts may be used. Hinge elements may be molded into the fame elements as well.

Figure 11A:
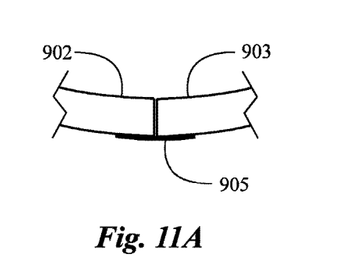
FIGS. 11A, B, C, and D illustrate hinge and fastening elements in an embodiment of the invention.
Figure 11B:
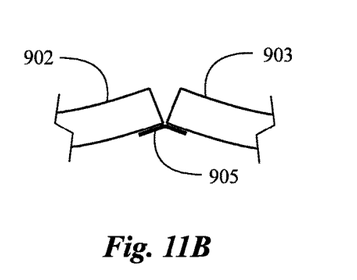

FIGS. 11A, B, C, and D illustrate hinge and fastening elements in an embodiment of the invention. FIG. 11 is a somewhat magnified view of the two frame elements and hinge element 905, with the frame closed. FIG. 11B shows the frame elements partly open such the thin strip hinge element 905 acts to hold the elements together as the assembly is opened and closed.

Figure 11C:
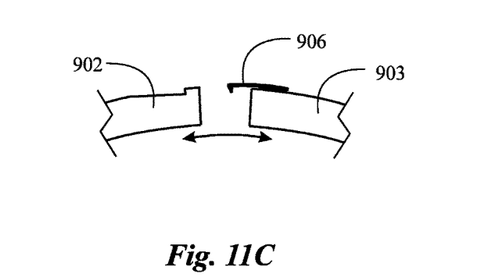

FIG. 11C shows a latch element 906 glued or heat welded to one of the frame elements, proximate the upper split line. Latch element 906 has a flexible arm with an angled, cantilevered end which latches to a groove machined into the opposite frame element as the two halves are rotated around the hinge to close the assembly, shown with the assembly open in FIG. 11C. The latch may be released when compression is applied to opposing sides of the device, relieving pressure on the latch, which is mechanically raised off the groove by a user at the cantilevered end.

Figure 11D:
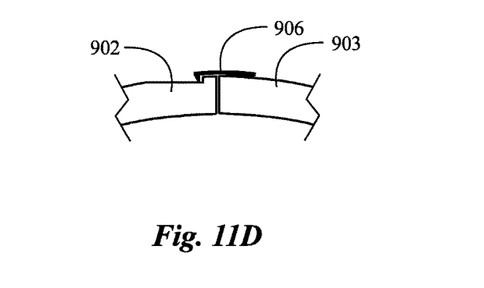

FIG. 11D shows the assembly with the two frame elements closed and latched. The frame elements may be implemented at specific places along a length of the cylindrical assembly.

Figure 12A:
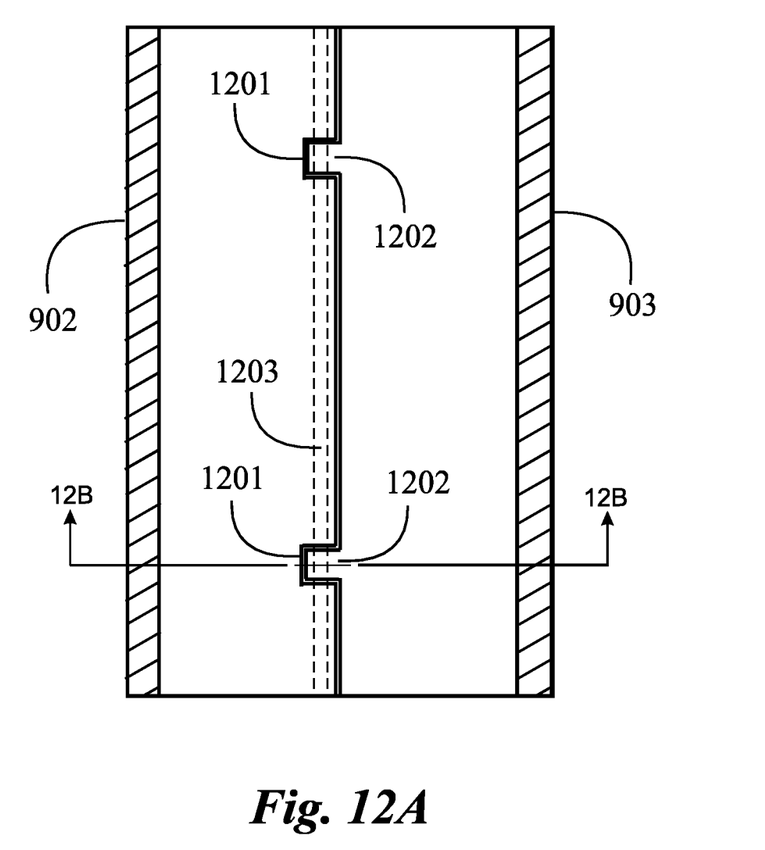
FIG. 12A is a section view of cylinder 901 illustrating hinges in an alternative embodiment.
Figure 12B:
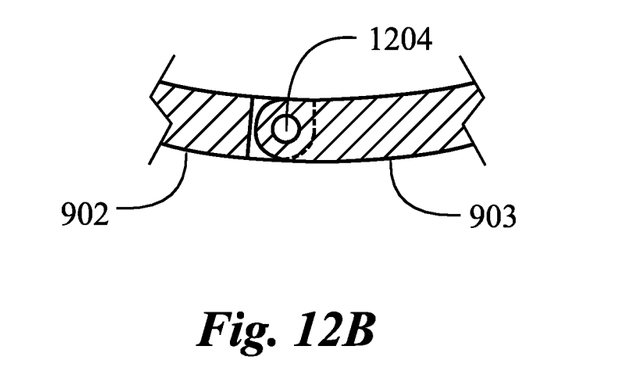
FIG. 12B is a partial section illustrating one of the hinges of FIG. 12A.

FIGS. 12A and 12B illustrate an alternative hinge mechanism. FIG. 12A is a section view of cylinder 901 illustrating two hinges implemented between half-cylinders 902 and 903 that comprise cylinder 901. In this implementation half-cylinder 902 has two rectangular notches 1201, and half-cylinder 903 has two rectangular appendages 1202, which are sized to fit into notches 1201 with clearance for rotation. A through bore 1203 is provided lengthwise to pass through portions of half-cylinder 902 and both appendages 1202. FIG. 12B is a partial section taken along section line 12B-12B of FIG. 12A, through half-cylinders 902 and 903, including one of appendages 1202. Pin 1204 is installed through bore 1203 to join the half-cylinders and complete the hinge mechanism. Bores through appendages 1202 are a few thousandths of an inch greater in diameter than through the body of half-cylinder 902, so the half-cylinders may rotate relative to one another, to open the body of the roller assembly.

The arrangement shown in FIGS. 12A and 12B, and described above, is exemplary. There may in other embodiments be more than the two hinge positions shown, and dimensions may vary. Further, in some embodiments separate pins may be installed for each hinge. The skilled person will understand that the notches and appendages may be implemented at positions along the length where there will be no interference with the appendages for roller assemblies.

Figure 13A:
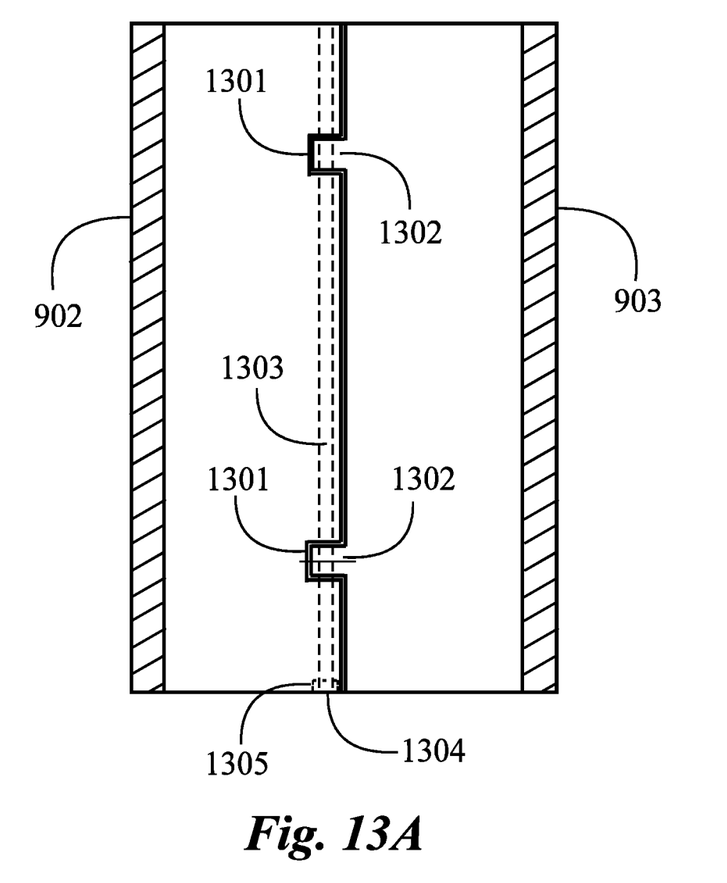
FIG. 13A is a plan view of cylinder 901 illustrating a closing mechanism in one embodiment.

FIG. 13A is a plain view of cylinder 901 illustrating a closing mechanism in one embodiment. In this implementation; the edges of half-cylinders 902 and 903 where the edges meet to close, are formed just as they are for the edges where the hinge mechanism is implemented. See notch elements 1201 and appendages 1202 in FIG. 12A, and notch elements 1301 and appendages 1302 in FIG. 13A. A single difference is in the pin 1204 for the hinge mechanism, as opposed to pin 1304 for the closing mechanism. Pin 1304, in one embodiment, passes through bore 1303 for the full length of the cylinder assembly, but has a short-threaded portion on one end that engages a female-threaded counter-bore 1305 and a screwdriver slot 1306 on the threaded end, for tightening the threaded pin in the threaded counter-bore. It should also be understood that the foam rubber elements 904, with half-cylinders closed, will exert outward pressure that will tend to aid the closure mechanism.

Figure 13B:
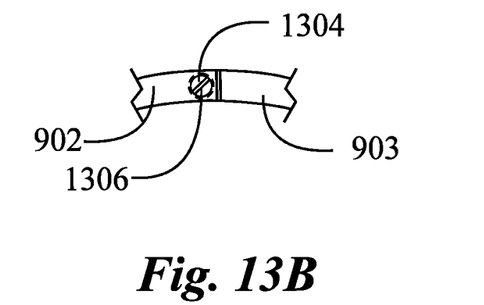
FIG. 13B is a partial end view of the closing mechanism of FIG. 13A

As is true of the hinge mechanism described with reference to FIGS. 12A and 12B, the closing mechanism described with reference to FIGS. 13A and 13B is exemplary only. The two notched and appendage shown could in one embodiment be one each, and in other embodiments may be more than two. There may be a threaded counter-bore on each end of bore 1303, and two pins with threaded portions, one engaging from each end. Dimensions may vary as well in different embodiments.

Further to the above descriptions of hinge and closing mechanisms, the skilled person will understand that these are just examples of a wide variety of ways that hinges and closures may be implemented.

It will be apparent to the skilled person that there may be a variety of ways to provide rollers on frames engaged with hoses or conduits, to reduce or eliminate friction in pulling the hoses or conduits over supporting surfaces, and that the very specific assembly of parts described in enabling detail above, are but one example of an mechanical assembly that will accomplish the purpose. Further, there may be many alterations in dimensions and materials, as well, other than the dimensions and materials indicated in examples thus far. The invention is thus limited only by the claims that follow.

The invention claimed is:

1. An apparatus providing rolling support for a hose or conduit, comprising:
a frame split lengthwise along two lines, providing two separate frame elements as half-cylinders, that joined along the split lines form a cylinder having an inside diameter and inside surfaces, an outside diameter and outside surfaces, and a lengthwise axis;
a hinge mechanism joining the separate frame elements along one of the split lines, and a closing mechanism implemented along the other split line, such that the frame may be opened manually and held closed;
a plurality of roller appendages extending outward from the outside surfaces of the cylindrical frame, each appendage providing axle rods extending on both sides of each appendage, orthogonal to both the axis of the cylindrical frame, and to a radius of a circular cross-section of the cylindrical frame; and
rollers rotational on the axle rods;
wherein the inside diameter of the cylindrical frame is compatible with a known hose or conduit diameter, and a user is enabled to open the cylindrical frame and close and latch the frame over a hose, providing a roller support for the hose or conduit.

2. The apparatus of claim 1 further comprising a relatively soft and resilient lining on the inside surfaces of the frame, enabling the frame to clamp securely over hoses or conduits of different diameters.

3. The apparatus of claim 1 wherein the rollers vary in cross-sectional diameter, tapering from a maximum diameter at the appendage to a minimum diameter at an end away from the appendage.

4. The apparatus of claim 1 wherein the appendages are implemented in three circumferential rows spaced along the length of the cylindrical frame, with three appendages in each row equally spaced around the circumference in each row.

5. The apparatus of claim 4 wherein appendages in adjacent rows are positioned around the circumference of each row such that individual appendages in each adjacent row are not in a line parallel with the axis of the cylindrical frame.

6. The apparatus of claim 1 wherein the rollers are formed of a high-density polymer material, to provide long-term wear characteristics.

7. The apparatus of claim 6 wherein the rollers are formed of metal and are coated with a high-density polymer material.

8. The apparatus of claim 1 wherein the hinge mechanism is a fabric or a thin plastic strip, heat-welded or glued to the outside surface of each of the two frame elements along one of the split lines.

9. The apparatus of claim 1 wherein the hinge mechanism comprises alternating notches and appendages implemented along edges of each half-cylinder, a bore passing lengthwise through the appendages, and a pin through the bore serving as a rotational axis for the half-cylinders to rotate relative to one another.

10. The apparatus of claim 1 wherein the latch includes a latch mechanism comprising a groove along one of the split lines on one of the two frame elements, and a flexible cantilevered latch element glued, heat welded, or otherwise affixed to the opposite frame element adjacent to the groove, such that closing the separate frame elements causes the cantilevered latch to engage the groove, and to hold the separate frame elements closed, to form the cylindrical aspect of the frame.

11. The apparatus of claim 1 wherein the closing mechanism comprises alternating notches and appendages implemented along edges of each half-cylinder, a bore passing lengthwise through the appendages, and a pin through the bore serving to engage the half-cylinders closed, the pin having a threaded portion engaging a female thread in a counter-bore in at least one end of the bore.

12. The apparatus of claim 1 wherein the appendages are implemented in two circumferential rows spaced along the length of the cylindrical frame, with three appendages in each row equally spaced around the circumference in each row.

\* \* \* \* \*